United States Patent [19]

Pearce

[11] Patent Number: 5,653,576
[45] Date of Patent: Aug. 5, 1997

[54] CAN LID DISTRIBUTOR APPARATUS

[75] Inventor: Ronald A. Pearce, Lakewood, Colo.

[73] Assignee: Rapsco, Incorporated, Denver, Colo.

[21] Appl. No.: 545,326

[22] Filed: Oct. 19, 1995

Related U.S. Application Data

[63] Continuation-in-part of Ser. No. 20,106, Feb. 19, 1993, Pat. No. 5,494,399.

[51] Int. Cl.$^6$ .................................................. B65G 60/00
[52] U.S. Cl. ............................ 414/797.7; 198/803.15
[58] Field of Search ......................... 198/477.1, 803.14, 198/803.15; 221/278; 406/151; 414/795.6, 797.4, 797.7, 788.4

[56] References Cited

U.S. PATENT DOCUMENTS

| | | | |
|---|---|---|---|
| 2,108,522 | 2/1938 | Bergmann. | |
| 3,938,675 | 2/1976 | Rees. | |
| 3,960,257 | 6/1976 | High et al. | 400/131 |
| 3,977,358 | 8/1976 | Stroobants | 118/2 |
| 4,262,629 | 4/1981 | McConnellogue et al. | 118/668 |
| 4,326,624 | 4/1982 | Ewertowski. | |
| 4,391,372 | 7/1983 | Calhoun | 209/523 |
| 4,544,314 | 10/1985 | Partyka | 413/26 |
| 4,848,060 | 7/1989 | Kubis et al. | 53/308 |
| 4,874,076 | 10/1989 | Kaplan. | |
| 5,113,636 | 5/1992 | Mihara et al. | 53/308 |
| 5,133,636 | 7/1992 | Hunt et al. | 414/755 |
| 5,151,001 | 9/1992 | Kawaguchi et al. | 414/225 |
| 5,476,362 | 12/1995 | Kobak et al. | 414/798.1 X |
| 5,494,399 | 2/1996 | Pearce | 414/788.4 |

*Primary Examiner*—James W. Keenan
*Assistant Examiner*—Janice L. Krizek
*Attorney, Agent, or Firm*—John E. Reilly

[57] ABSTRACT

A distributor apparatus is characterized by having a transfer starwheel with individual pockets which are successively advanced beneath a feeder unit, such as a downstacker mechanism, each pocket in succession receiving an individual can end advanced into the pocket by the downstacker and each end selectively removed from the pocket by application of a differential pressure to the lid when it moves into alignment with a vacuum chute. One or more vacuum chutes may be placed in the path of movement of the pockets of the transfer starwheel to direct the lids into one or more lanes for advancement to another station.

19 Claims, 4 Drawing Sheets

CAN LID DISTRIBUTOR APPARATUS

CROSS-REFERENCE TO RELATED APPLICATION

This application is is a continuation-in-part of Ser. No. 020,106 filed 19 Feb., 1993, now U.S. Pat. No. 5,494,399, for CAN END DISTRIBUTOR APPARATUS.

BACKGROUND AND FIELD OF INVENTION

This invention relates to dispensing apparatus, and more particularly relates to a novel and improved apparatus for transferring flat articles, such as can lids from one or more can lid feeder mechanisms into other stages of the can-forming operation in a highly automated but simplified manner.

The transfer of can lids throughout the manufacturing line has become increasingly automated requiring close coordination between the delivery of lids from one or more downstacker mechanisms to a plurality of discharge stations. For example, it is desirable to be able to supply as many as 4400 lids per minute to one or more discharge lanes in a completely automated operation while occupying a minimum of space.

Downstacker mechanisms are commercially available which are capable of delivering lids from one or more chutes onto a starwheel for advancement into an end liner apparatus, for example, as set forth and described in U.S. Pat. No. 4,262,629 to McConnellogue et al. However, it is equally important to provide for positive advancement and discharge of the ends or lids from the downstacker into a plurality of lanes or discharge chutes in such a way as to meet the ever-increasing demand for ends from various downstream equipment in addition to the end liner apparatus.

Of the systems that have been devised in the past, U.S. Pat. No. 3,938,675 to H. Rees employs intermeshing starwheels for advancing lids or ends to one or more lanes with the aid of a lift plunger. U.S. Pat. No. 5,113,636 to H. Mihara et al discloses a can end feeding apparatus for advancing ends from a starwheel onto can bodies filled with liquid. U.S. Pat. No. 4,544,314 to E. S. Partyka is directed to a lane balancer having intermeshing starwheels to receive can ends from a screw mechanism including a primary discharge lane through which the bulk of the ends will pass from each starwheel and a secondary lane for receiving surplus ends; a vacuum plenum is used to aid in guiding the ends. Other patents of interest in this area are U.S. Pat. Nos. 2,108,522 to C. N. Bergmann; 3,977,358 to A. Stroobants; 4,326,624 to N. Ewertowski et al; 4,391,372 to F. L. Calhoun, 4,848,060 to C. S. Kubis et al, 4,874,076 to H. Kaplan et al and 5,133,636 to R. E. Hunt et al.

SUMMARY OF INVENTION

It is an object of the present invention to provide for a novel and improved lane modulator for distributing can ends from one or more can feeder units to downstream equipment in a simplified and highly efficient and fully automated manner.

It is another object of the present invention to provide a novel and improved can lid distributor apparatus which is closely correlated in its operation with the advancement of lids from one or more downstacker mechanisms to deliver said lids to one or more discharge lanes by regulating the differential pressure on opposite sides of the lid at each station or lane entrance.

It is a further object of the present invention to provide for lane distributor apparatus for feeding articles, such as can lids and the like from a plurality of stacks of lids to a plurality of discharge lanes and in such a way as to be capable of balancing the supply of lids to each discharge lane according to the demand for lids placed on that lane.

It is an additional object of the present invention to provide for novel and improved lane distributor apparatus which is conformable for use with various types of down-feed mechanisms in such a way as to assure positive removal and displacement of each lid into a selected stack of lids in a fully automated sequence of operations.

In accordance with the present invention, apparatus has been devised for transferring flat articles, such as can lids and the like from one or more stacks of ends to one or more discharge lanes, a starwheel having a plurality of circular pockets at spaced circumferential intervals around its outer periphery and which pockets are successively advanced into registry with lids advanced one at a time from a stack of lids, each pocket including can lid-receiving means engageable with an outer rim of an individual can lid advanced into the pocket, pneumatic pressure-controlled pocket drive means associated with each pocket for positively removing each lid from the pocket, and at least one discharge chute aligned in the path of movement of each end removed from the pocket including guide means for guiding each end from the pocket into the discharge chute.

In its preferred form, the pocket drive means are so constructed and arranged as to be incorporated into the profile of the starwheel so that the starwheel is capable of advancing through the limited clearance afforded between the downstacker chute and guide track of conventional downstacker apparatus; and further in such a way as to assure that each lid can be positively advanced into a respective pocket. The pocket drive means controls the differential air pressure on opposite sides of each lid and vanes to advance a selected lid downwardly out of the pocket into a discharge chute when selectively activated at a particular discharge station. Each discharge chute in turn includes an exit track which in cooperation with vacuum-applying means assures that the end will maintain the proper orientation to move into nested relation to a stack of lids in the discharge chute.

The above and other objects of the present invention will become more readily appreciated and understood from a consideration of the following detailed description of preferred and modified forms of the present invention when taken together with the accompanying drawings in which:

DETAILED DESCRIPTION OF PREFERRED EMBODIMENT

Figure 1:
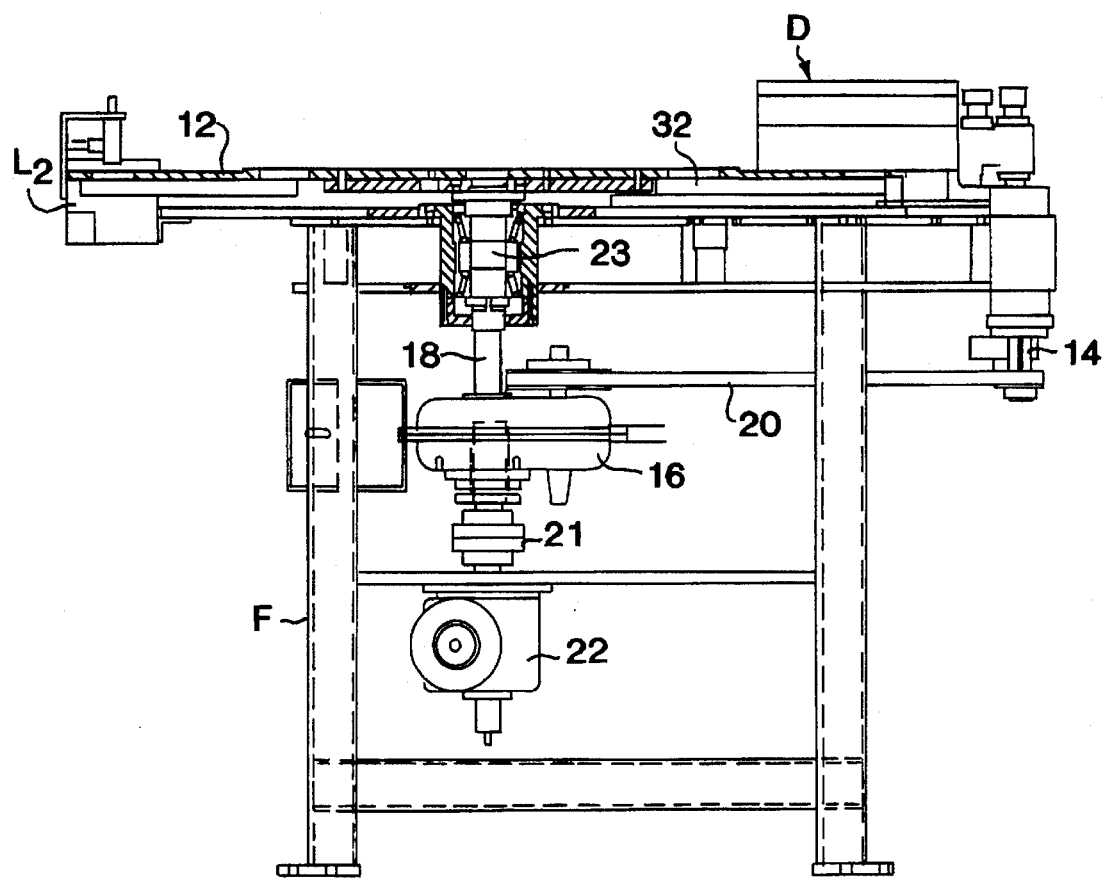
FIG. 1 is a front view in elevation of a preferred form of apparatus in accordance with the present invention.
Figure 2:
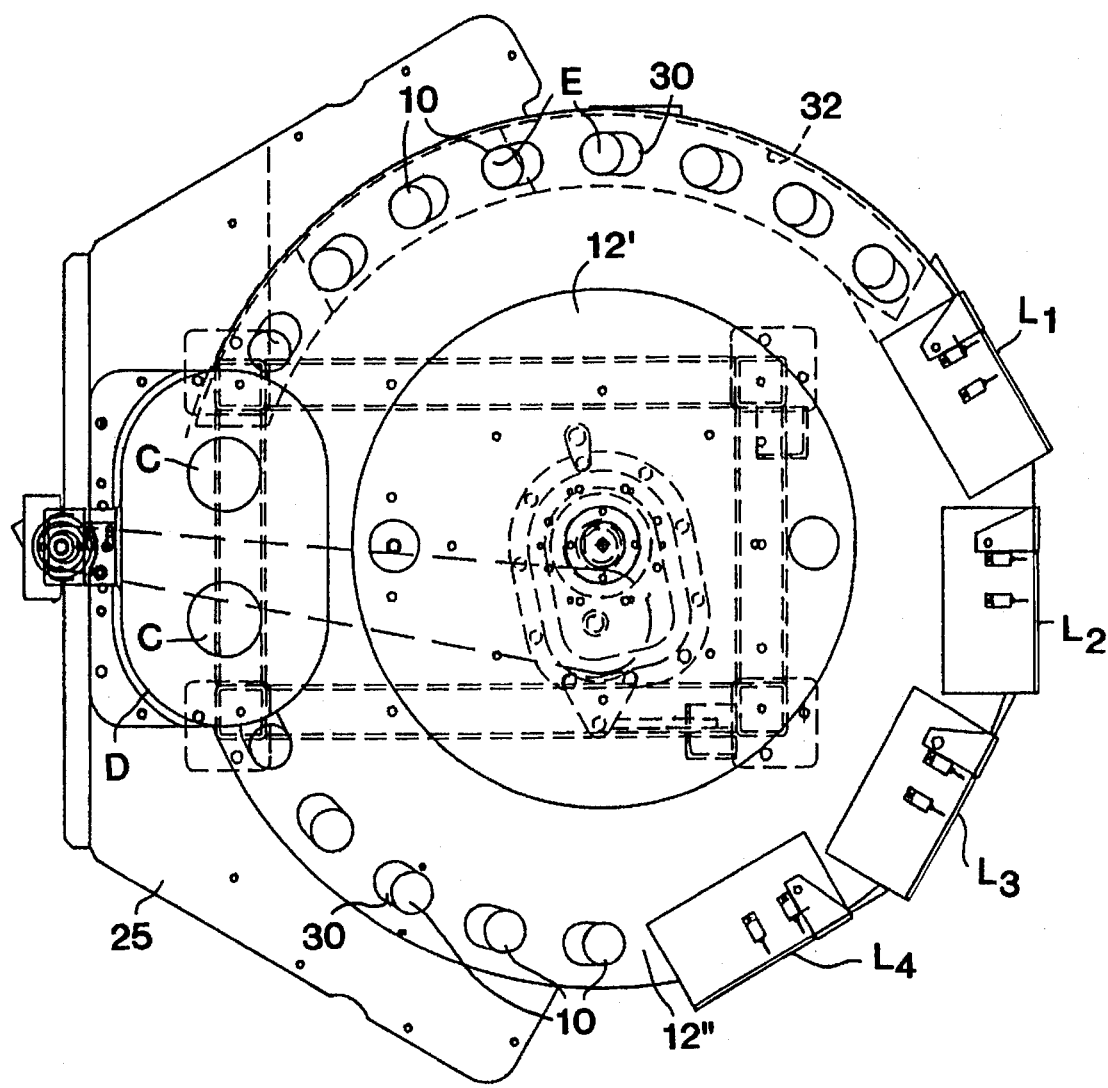
FIG. 2 is a top plan view of the apparatus illustrated in FIG. 1.

Referring in more detail to the drawings, a double downstacker designated D is of conventional construction and for the purpose of illustration may be a Dual Downstacker manufactured and sold by Preferred Machining Corporation of Denver, Colo. Briefly, the system includes a pair of delivery chutes C for delivery of can lids E from a stack in each chute successively into a series of pockets 10 on a starwheel or pocket wheel 12 which is mounted for rotation above a frame F. In order to synchronize advancement of the lids E from the downstacker D with the advancement of the starwheel 12, a jack shaft 14 drives the feed screw mechanism of the downstacker D, the jack shaft 14 being driven by a speed reducer 16 on a main shaft 18 through a power transmission belt 20 into the jack shaft. A flexible coupling 21 on the shaft 18 interconnects the speed reducer to the output shaft of a drive motor 22. The starwheel 12 is mounted for rotation by the shaft 18 through an axle bearing 23, the starwheel being releasably positioned on the bearing assembly, as shown in FIGS. 1 and 2. It will be further seen from FIG. 2 that the downstacker unit D is mounted on a support plate 25 in outer partially surrounding relation to the starwheel 12 and that the support plate may accommodate additional downstacker units on either side of the unit D depending upon the number of lids to be introduced into the starwheel pockets 10. In a two-in/three-out lane configuration for delivering can lids into an end liner, there are three discharge lanes or stations represented at $L_1$, $L_2$ and $L_3$ plus a sampling discharge station $L_4$ generally disposed in diametrically opposed relation to the downstacker unit D. In a manner to be described, the differential pressure established at each discharge station will determine whether a lid is removed or not. The sampling discharge station $L_4$ is provided for the purpose of removing lids that have passed through the first three stations and not been removed or which for example may become jammed.

Referring to FIGS. 1 to 4, the pocket wheel 12 is in the form of a flat circular disk having a separable center portion 12', and an outer annular portion 12" of the pocket wheel 12 is keyed for rotation with portion 12'. The pockets 10 are arranged at equally spaced circumferential intervals around the outer periphery of the annular portion 12", each pocket 10 extending through the thickness of the pocket wheel and including a shallow, generally circular groove 30 forming an entrance for each lid deposited by the downstacker D into a pocket 10 as it passes beneath the downstacker chutes C. The lid E is advanced into centered relation to each pocket 10 and supported therein by an arcuate support track 32, the track being mounted on an upper table surface of the frame F and terminating adjacent to the first discharge station $L_1$.

Figure 3:
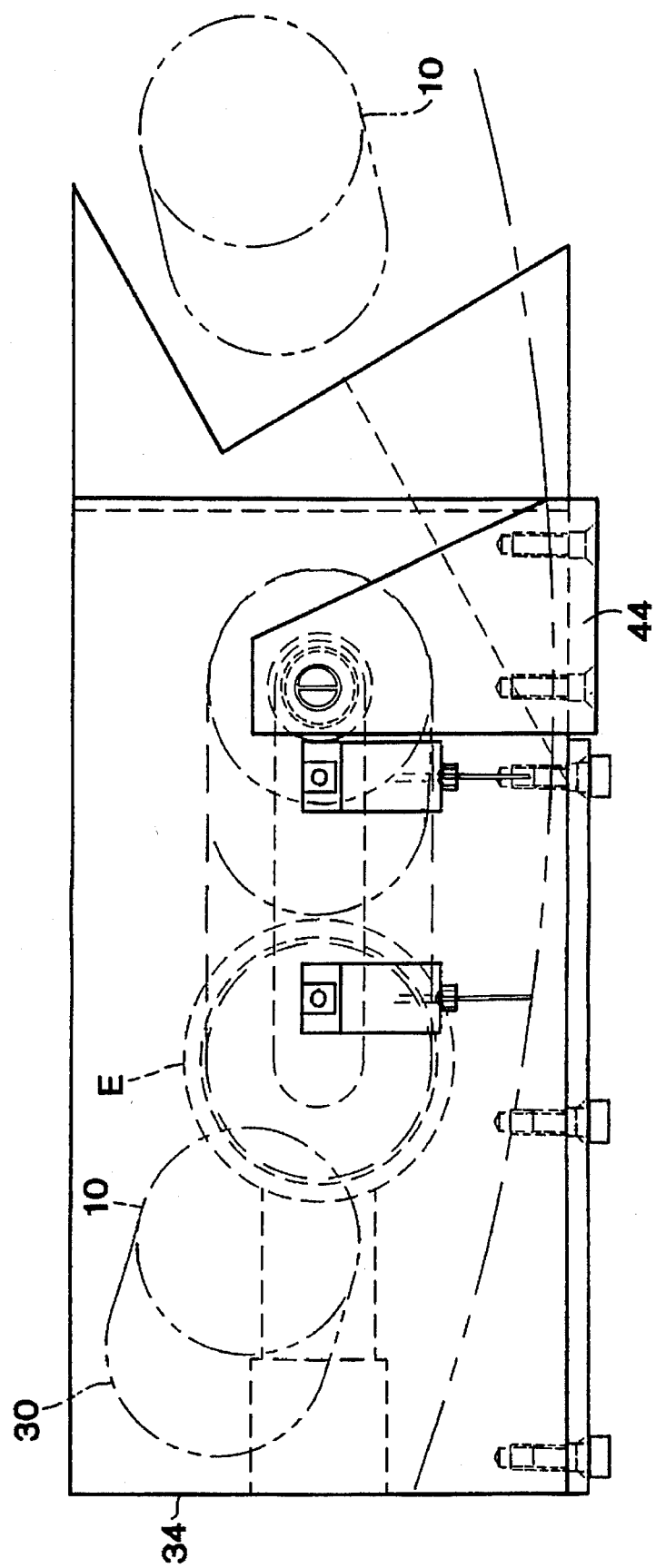
FIG. 3 is a plan view enlarged of one of the can lid discharge stations in accordance with the present invention.
Figure 4:
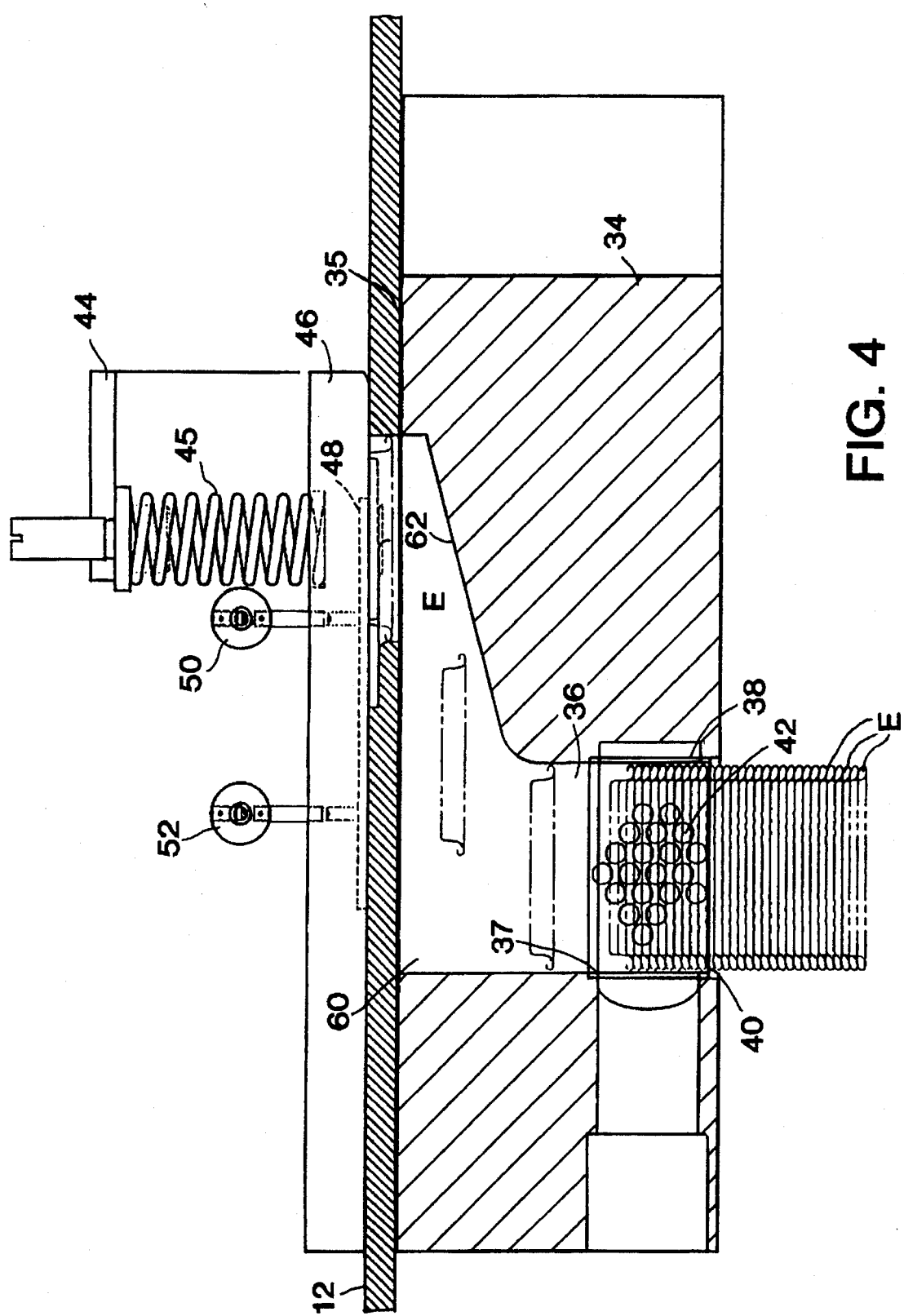
FIG. 4 is another enlarged view in cross-section of an individual pocket and discharge station of the starwheel transfer apparatus.

As best seen from FIGS. 3 and 4, each discharge station $L_1$ to $L_4$ includes a generally rectangular vacuum block 34 having an upper flat surface 35 and a vacuum chute 36 converges downwardly from the upper flat surface into a vertical bore 37. A source of vacuum, not shown, communicates with the bore 37 through a counterbore 38 in which is positioned a perforated sleeve 40. The sleeve 40 has perforations 42 formed at uniformly spaced intervals around its outer periphery in order to uniformly distribute the downward flow of air created by the vacuum source through the chute 36. As the pocket wheel 12 is advanced from the rail 32 over the upper flat surface 35 of each discharge station, an individual pocket 10 moves into registry with an upper end of each chute 36. A generally L-shaped overhead bracket 44 at each discharge station serves as a spring tension mount for a compression spring 45 having a shoe plate 46 at its lower end, the plate 46 being urged into sealed engagement with the upper surface of the starwheel 12 surrounding the pocket 10. If it is desired to remove the lid E downwardly through the vacuum chute 36, positive air pressure is applied to the upper surface of each lid E through a manifold 48 in the shoe plate 46, the delivery of air under pressure being controlled by a first solenoid valve 50. However, should the system dictate that the lid E not exit at a particular station, a second solenoid valve 52 is energized to establish a high vacuum condition in the manifold 48 above the lid thereby overcoming the vacuum pressure in the chute 36 to prevent the lid E from exiting its pocket 10 and retaining the lid in sealed engagement with the shoe plate 46 so that it is carried to the next discharge station.

Each vacuum chute 36 includes a downwardly convergent entrance 60 which is offset from the bore 37 and has a gradually sloping, downwardly inclined surface 62 for guiding each of the lids E away from the pocket. The perforated sleeve 40, as noted earlier, uniformly distributes air flow downwardly through the chute 36 to encourage each lid to move into properly aligned relation transversely across the bore 37 and move evenly into the stack of lids at each of the discharge lanes extending downwardly from the bore 37. As more fully disclosed in copending application Ser. No. 020,106, sensing elements are provided in each discharge lane to signal a requirement for lids until each discharge lane is uniformly filled.

In a typical operation which is given for the purpose of illustration but not limitation, two lanes of lids are delivered into the downstacker D, the lids E being advanced in succession into each starwheel pocket 10 and then transferred to a series of discharge lanes $L_1$, $L_2$ and $L_3$ for discharging the lids E to a downstream location, such as, to an end liner or a press. The discharge lane $L_4$ may serve as an input to a tray palletizer to remove any lid E not discharged into one of the stations $L_1$ to $L_3$ in the event of jamming or if the downstream equipment should go down or not be operative. The control concept for the apparatus of the present invention is based on the demand for lids from the downstream equipment plus the availability and speed of equipment feeding ends to the apparatus. Each of the infeed downstackers D has a cut-off knife to control the end feed in each downstacker chute C, and input level sensors, not shown, will cooperate with the outfeed sensors to determine which cut-off knives should be opened or closed in the downstacker. This timing, including compensation for solenoid, cylinder and air response time is accomplished in the logic; and, if required, response time of each solenoid 50 or 52 is measured and used to determine the time needed to advance the signal for each open and closed operation. The ends per minute handled is governed by the revolutions per minute and number of pockets 10 in the starwheel 12. Appropriate balance of the ends out versus ends being fed to the starwheel 12 is controlled by a variable speed drive in the manner described and in association with the various infeed and outfeed sensors. Speed and/or demand information from the upstream end downstream equipment also may be employed by the logic controls to adjust the speed and ends per minute through-put of the apparatus.

It is therefore to be understood that while a preferred form of apparatus has been herein set forth and described, various modifications and changes may be made without departing from the spirit and scope of the present invention as defined by the appended claims and reasonable equivalents thereof.

I claim:

1. In article transfer apparatus for transferring flat articles from one or more stacks of articles to one or more discharge lanes and wherein an article feeder includes means for advancing said articles one at a time from said stack, the improvement comprising:

a starwheel having a plurality of pockets at spaced circumferential intervals;

means for rotating said starwheel such that said pockets are successively advanced into alignment with said articles advanced by said feeder and each of said articles is deposited into one of said pockets;

pressure-applying means at a location circumferentially spaced from said feeder and in the path of travel of said articles in said pockets, and means for activating said pressure-applying means for applying a downward pressure on each of said articles causing it to be advanced downwardly through a respective pocket; and guide means for guiding each said article removed from one of said pockets by said pressure-applying means away from said starwheel.

2. In article transfer apparatus according to claim 1, wherein each said pocket has an outer edge surrounding an outer peripheral edge of each said article, and a support member for supporting each said article in an associated one of said pockets between said feeder and said pressure-applying means.

3. In article transfer apparatus according to claim 1, wherein said pressure-applying means includes a spring-loaded shoe movable into sealed engagement with a portion of said starwheel surrounding each said pocket as said pocket moves into alignment with said pressure-applying means.

4. In article transfer apparatus according to claim 3, wherein said pressure-applying means includes a source of air under pressure communicating with each said pocket as it is advanced beneath said shoe.

5. In article transfer apparatus according to claim 3, wherein said guide means includes a source of vacuum for maintaining a negative pressure beneath each said article.

6. In article transfer apparatus according to claim 1, wherein each said pocket includes a guideway for guiding each said article from said feeder into said pocket.

7. In article transfer apparatus according to claim 6, wherein each said guideway is in the form of a shallow recess communicating with a surrounding edge of said pocket.

8. In article transfer apparatus according to claim 1, wherein said pressure-applying means is characterized by establishing a differential air pressure above and below each said pocket causing each said article to be removed from said pocket.

9. In article transfer apparatus according to claim 1, said guide means including a downwardly convergent vacuum chute and vacuum-applying means for drawing each said article removed from each said pocket downwardly through said vacuum chute.

10. In can end transfer apparatus for transferring can ends from one or more stacks to one or more discharge lanes and wherein a can end feeder includes means for advancing can ends one at a time from said stack, the improvement comprising:

a pocket wheel having a plurality of circular pockets arranged at equally spaced circumferential intervals therein;

means for rotating said pocket wheel to advance said pockets successively into registry with said ends advanced by said feeder whereby each of said ends is deposited into a successive one of said pockets;

at least one discharge station, each said station including pressure-applying means in the path of travel of said can ends which have been deposited in said pockets, and means for activating said pressure-applying means to apply a differential air pressure to each of said can ends causing each said end to be advanced downwardly from an associated pocket; and guide means for guiding each said can end removed from one of said pockets away from said pocket wheel.

11. In can end transfer apparatus according to claim 10, wherein a guide track extends beneath said pockets between said can end feeder and said discharge station.

12. In can end transfer apparatus according to claim 10, wherein each said station includes sealing means for effecting sealed engagement with an upper surface of said pocket wheel surrounding each said pocket as said pocket moves into alignment with said pressure-applying means.

13. In can end transfer apparatus according to claim 12, wherein said sealing means includes a spring-loaded shoe movable into engagement with said upper surface portion of said pocket wheel.

14. In can end transfer apparatus according to claim 12, wherein said pressure-applying means includes a first vacuum source for maintaining a negative pressure beneath each said end and a source of air under pressure for maintaining a positive pressure above each said end.

15. In can end transfer apparatus according to claim 14, wherein a second vacuum source is provided above each successive end advanced through said discharge station, and means for selectively activating said second vacuum source.

16. In can end transfer apparatus according to claim 15, wherein solenoid control means is provided for selectively activating said positive source of air pressure and said second vacuum source.

17. In can end transfer apparatus according to claim 16, wherein said second vacuum source establishes a greater negative pressure than said first vacuum source.

18. In can end transfer apparatus according to claim 10, wherein guide means is provided for guiding each said end removed from one of said pockets at said discharge station away from said pocket wheel.

19. In can end transfer apparatus according to claim 18, wherein each said guide means includes a guideway in the form of a shallow recess communicating with each said pocket in succession.

* * * * *